Oct. 22, 1963

M. E. HARDY ET AL 3,107,835

TAPE RECORDER

Filed July 10, 1961

6 Sheets-Sheet 1

INVENTORS
MAURICE E. HARDY
EUGENE J. POLLEY
RICHARD L. ROST

BY Francis W. Crotty

ATTORNEY

INVENTORS
MAURICE E. HARDY
EUGENE J. POLLEY
RICHARD L. ROST
BY Francis W. Crotty
ATTORNEY INVENTORS
MAURICE E. HARDY
EUGENE J. POLLEY
RICHARD L. ROST
BY Francis W. Crotty
ATTORNEY INVENTORS
MAURICE E. HARDY
EUGENE J. POLLEY
RICHARD L. ROST
BY Francis W. Crotty
ATTORNEY

TAPE RECORDER

Filed July 10, 1961 6 Sheets-Sheet 5

INVENTORS
MAURICE E. HARDY
EUGENE J. POLLEY
RICHARD L. ROST

BY Francis W. Crotty
ATTORNEY

INVENTORS
MAURICE E. HARDY
EUGENE J. POLLEY
RICHARD L. ROST
BY Francis W. Crotty
ATTORNEY 3,107,835
TAPE RECORDER
Maurice E. Hardy, Evanston, Eugene J. Polley, Lombard, and Richard L. Rost, Barrington, Ill., assignors to Zenith Radio Corporation, a corporation of Delaware
Filed July 10, 1961, Ser. No. 122,933
3 Claims. (Cl. 226—179)

This invention relates to recording and reproducing devices. More specifically, it relates to apparatus for playing a record-bearing member such as a tape housed in a cartridge.

There are numerous types of recording and reproducing equipment available and they may be readily divided into two classes. In the first class are those devices which employ two interchangeable reels and have a transport mechanism which moves the record, be it tape or wire, from reel to reel. In the second class are those devices which employ magazines containing the records. The simplest of devices of the latter class employs a cartridge containing both a supply reel having the record wound thereon and a take-up reel for receiving the record as it is being played. A preferred device of the magazine type utilizes a cartridge, having a record wound upon a supply reel therein, in conjunction with a single take-up reel serving all the cartridges that are played.

Almost all of the machines which utilize the reel to reel transport mechanism require that the operator thread the tape through the transport mechanism and require attention of the operator near the finish of tape transcription to prevent the machine from damaging the end of the tape after it has been completely transcribed. Machines that use the two-reel type of cartridge eliminate some of the problems of the reel to reel machine but the cartridges containing two reels are necessarily large and cumbersome to handle and store.

With the development of a recording cartridge containing only a supply reel approximately the size of a folded handkerchief, it has been possible to construct a recording and reproducing device for individually playing such cartridges which eliminates many of the previously mentioned undesirable characteristics of prior recording apparatus.

In the copending applications of Richard E. Schmid, Serial No. 122,929, Ralph W. Galk et al., Serial No. 122,715, Richard L. Rost, Serial No. 122,916, Eugene J. Polley et al., Serial No. 122,930, and Maurice E. Hardy, Serial No. 122,934, all filed concurrently with this application and assigned to the same assignee as the present invention, there are described and claimed devices and apparatus which are closely related to the invention.

It is a general object of the present invention to develop a single play apparatus which overcomes and minimizes the aforenoted deficiencies and disadvantages of prior single play recording and reproducing apparatus.

It is a specific object of this invention to provide a new and improved method of aligning the tape driving mechanism of the apparatus.

It is also a particular object of this invention to provide a self-aligning pressure roller which prevents skew movement of the tape as it is transported by the capstan.

Still another object of this invention is to provide single play tape recording apparatus which is both inexpensive to manufacture and utilizes a minimum number of components.

In accordance with this invention the winding and reeling apparatus for transporting a flexible tape employs a self-aligning pressure roller mechanism for preventing skew movement of the tape as it is transported by the capstan. More specifically, the apparatus comprises a transport mechanism, including a capstan, having an axis of rotation, for moving the tape between the reels. In addition, a pressure roller, likewise having an axis of rotation is maintained in a rest position adjacent the capstan during quiescent intervals of operation but is movable to an operating position to effect transport of the tape by the capstan. Additionally, there are also provided first aligning means for displacing the axis of the roller in a plane parallel to the axis of the capstan to establish coplanar relation of their axes. Moreover, the apparatus further comprises self-aligning means for displacing the axis of the roller in the plane of the axis of the capstan to establish a parallel relation of the axes in their common plane when the roller is in its operating position.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
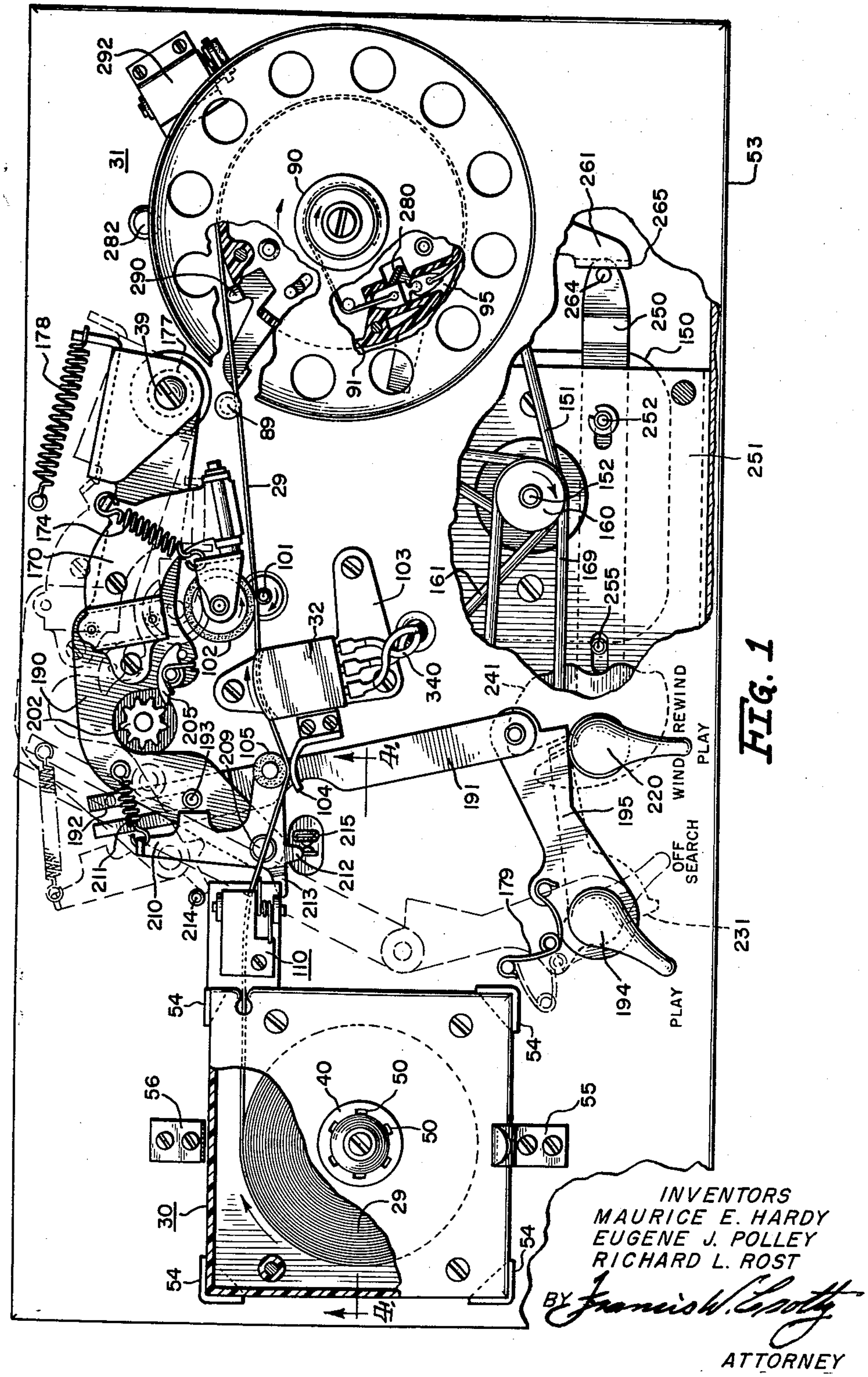
FIGURE 1 is a plan view partly broken away of the apparatus of the present invention.

The apparatus of FIGURE 1 may be used for transcribing tape, wire or other flexible recording media but, as illustrated, is employed for recording and reproducing on tape. The major component parts of the apparatus comprise a cartridge 30 and associated supporting means, a spindle assembly for accepting the cartridge, a take-up arrangement including a take-up reel 31 through which tape is presented in coupling or reading relation to a magnetic transducer head 32, a driving system to effect winding of the tape as between the take-up and supply reels, and a time-delayed pressure roller moving mechanism. For convenience, these major components will be considered individually and in recited order after which a résumé of overall operation will be given.

*Tape Cartridge*

Figure 4:
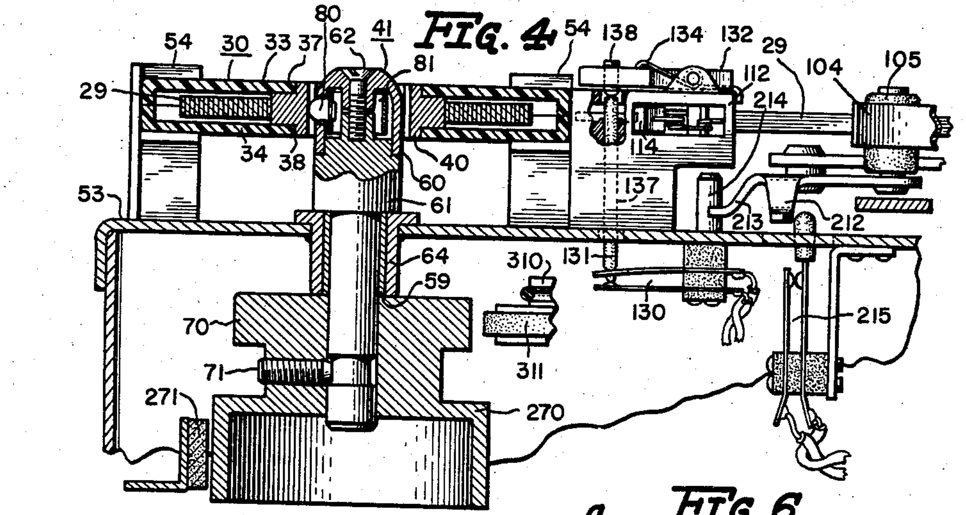
FIGURE 4 is a cross-sectional view taken along lines 4—4 of FIGURE 1.

The tape cartridge 30 may take many of a variety of specifically different configurations, a suitable one being represented in both FIGURES 1 and 4. As represented, the cartridge is formed of a pair of essentially rectangular rigid plates 33 and 34 with a peripheral flange of such depth that the plates, superposed with their flanges in meeting engagement, define a cavity to accommodate the desired number of convolutions of a magnetic tape 29 of a specified width. Machine screws may retain the plates in assembled relation. Plates 33 and 34 have centrally located apertures 37 and 38 respectively. A hub 40 is interposed between the plates and has a reduced diameter section which corresponds with the diameter of apertures 37 and 38 and the hub together with the apertures collectively define a channelway for accepting a spindle 41, that is, for permitting the cartridge to be threaded over the spindle thereby positioning it on the apparatus.

Th hub 40 is rotatably supported within the cartridge and convolutions of tape material are coiled thereabout. The inner end of the tape is affixed to the hub in any conventional fashion, such as by cementing, and the free end of the tape terminates in a coupler 42 which appears more clearly in FIGURE 2. The coupler has a height approximately equal to the tape width and has a bifurcated configuration which defines a channelway into which a mating coupler, hereinafter referred to as an extractor, may be inserted to couple the tape to the take-up reel. Except when being transcribed or rewound, the tape is completely confined within the cartridge with the channelway of the coupler in alignment with a similar channelway formed in a corner of the cartridge casing as appears in FIGURE 1.

The inner periphery of hub 40 bears a series of formed slots or keyways 50 which are the means through which a mechanical driving connection may be completed to the hub from the driving spindle 41.

The cartridge is positioned on a deck 53 of the apparatus through the use of a set of four mounting posts 54 which are firmly attached to the deck. These posts each have step-like portions for positioning the cartridge in the vertical as well as the horizontal plane as can be seen from FIGURES 1 and 3. They present a cartridge at the proper level to couple the tape carried therein to the extracting device, presently to be described, by means of which the tape may be coupled into the instrument with a minimum of effort on the part of the operator. A pair of resilient clamping devices 55 and 56 firmly hold the cartridge in place but yield when a cartridge is to be inserted or removed from the apparatus. It should be noted that the tape cartridge described and claimed in the previously mentioned copending application of Richard L. Rost as well as any similar cartridge may be transscribed with the apparatus described herein.

*Spindle Assembly*

As seen in FIGURE 4, the spindle assembly 41 for accepting the tape cartridge is positioned centrally in the area defined by the four cartridge positioning posts 54 and is rotatably mounted on deck 53. The spindle comprises a tapered cap 60 which is held to a driving shaft 61 by a screw 62. An aperture located in deck 53 receives a collar 64 having an upper flange for supporting an enlarged diameter portion of the shaft. The collar captivates a bearing 59 which receives a reduced diameter portion of shaft 61. The bottom portion of shaft 61 is coupled to a drive drum 70 which is firmly fastened to the shaft by a screw 71 received in a locking groove milled in the shaft. The purpose of drum 70 will be discussed more fully hereinafter.

A mechanical driving connection is extended from cap 60 to hub 40 of the tape cartridge by means of a drive pin 80 included within cap assembly 60 but projecting from an aperture therein to be accepted by one of slots 50 of the cartridge hub as shown in FIGURES 1 and 4. Drive pin 80 is carried by an annular-shaped spring formed of a band of spring steel and retained within cap 60. The spring biases drive pin 80 radially outwardly of the cap. If drive pin 80 is not in alignment with a slot in the cartridge hub at the moment the cartridge is placed over spindle 41, the pin, which is of crescent shape, is cammed into cap 60 against the bias spring 81 and recedes within the cap. When it is desired to extend the mechanical driving connection to hub 40 of the cartridge, cap 60 is rotated and pin 80 is brought into alignment with one of the slots 50. At that time, it enters the slot under the influence of spring 81 and completes the necessary mechanical connection.

*Take-Up Arrangement*

In order to transcribe the tape in the cartridge, a take-up mechanism draws the tape along a path wherein it is presented in magnetic coupling relation to transcribing head 32. This is a requirement for both reproducing a program previously recorded on the cartridge and for recording a program on a blank tape fed from the cartridge. For convenience, however, reproducing alone will be considered.

Figure 5:
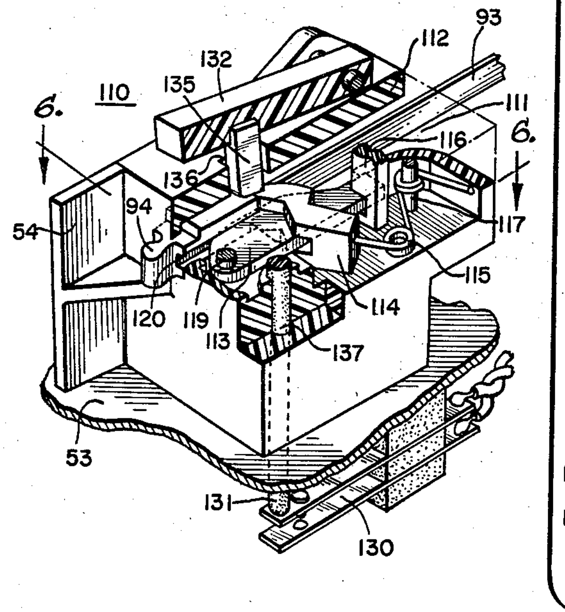
FIGURE 5 is a fragmentary perspective view partly in section of the extractor housing of FIGURE 1 with the extractor positioned therein.
Figure 6:
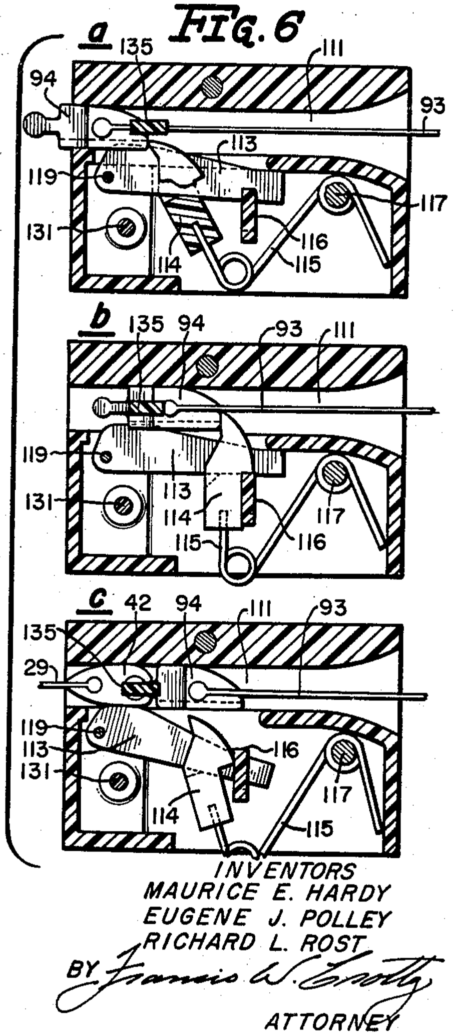
FIGURE 6 shows three cross-sectional views taken along lines 6—6 of FIGURE 5 of typical positions of the extractor housing of FIGURE 1.
Figure 9:
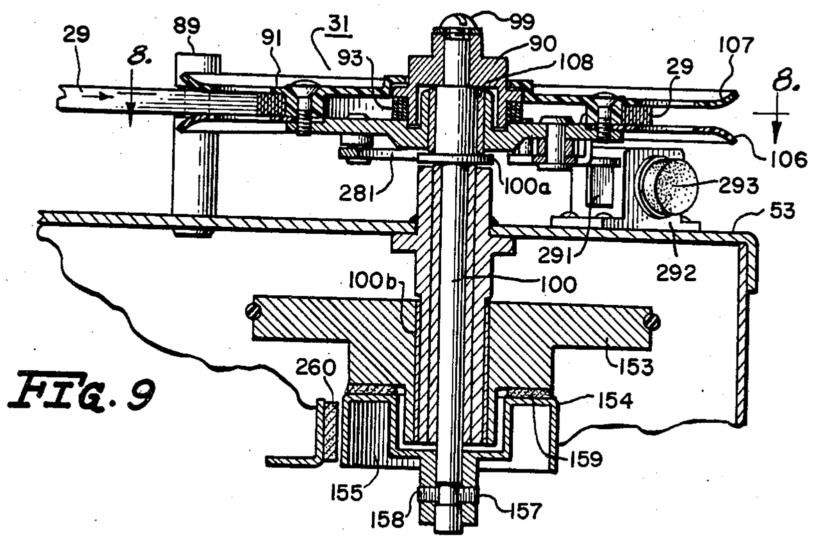
FIGURE 9 is a cross-sectional view taken along lines 9—9 of FIGURE 8.
Figure 8:
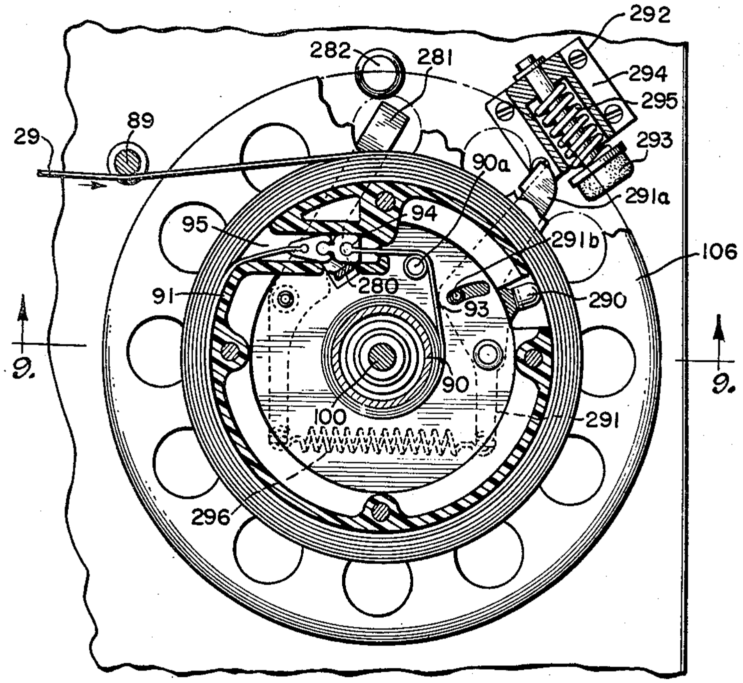
FIGURE 8 is a cross-sectional view of the take-up reel of FIGURE 1 taken along lines 8—8 of FIGURE 9.

The take-up mechanism comprises a reel 31 having an inner hub 90 and an outer hub 91 as shown most particularly in FIGURES 8 and 9. A flexible leader 93, which may be a strip of plastic or nylar tape, is affixed to inner hub 90 at one end and terminates at the opposite end in a coupling 94 which has been referred to above as an extractor. The detailed views of FIGURES 5 and 6 show that the extractor terminates in a formed section which may slide into the bifurcated coupling termination 42 of the tape carried by the cartridge as the cartridge is threaded over spindle 41 and received by posts 54. Of course, this presupposes that the cartridge is properly oriented in the manner of FIGURE 1 to present its termination 42 in coupling relation to extractor 94. The leader 93 passes from hub 90 over a guide post 90*a* and through a channelway 95 formed integrally with outer hub 91 and having a port on the surface of hub 91 to provide access to inner hub 90 as well as a nesting place for the extractor and coupler during transcription. When the extractor and coupler are nested in channelway 95 as shown in FIGURE 8, they couple the hubs together to bring about rotation of outer hub 91 due to a constant force which is applied to the leader and couplers by inner hub 90 during transcription when hub 90 serves as a driver. This will be explained more fully hereinafter.

Inner hub 90 has a body portion with an extended cylindrical section projecting from one face to receive convolutions of leader 93 as shown in FIGURE 9. A reduced diameter cap portion projects from the other face and accommodates a machine screw 99 through which the hub is secured to a drive shaft 100.

Outer hub 91 is formed of two flange plates 106 and 107 locked together by screws. Plate 107 has a large centrally located aperture through which the body section of hub 90 passes freely in order that there may be free relative rotation therebetween. Plate 106 on the other hand has a sleeve section formed centrally therein and a bearing 108 is interposed between this sleeve and shaft 100.

Figure 2:
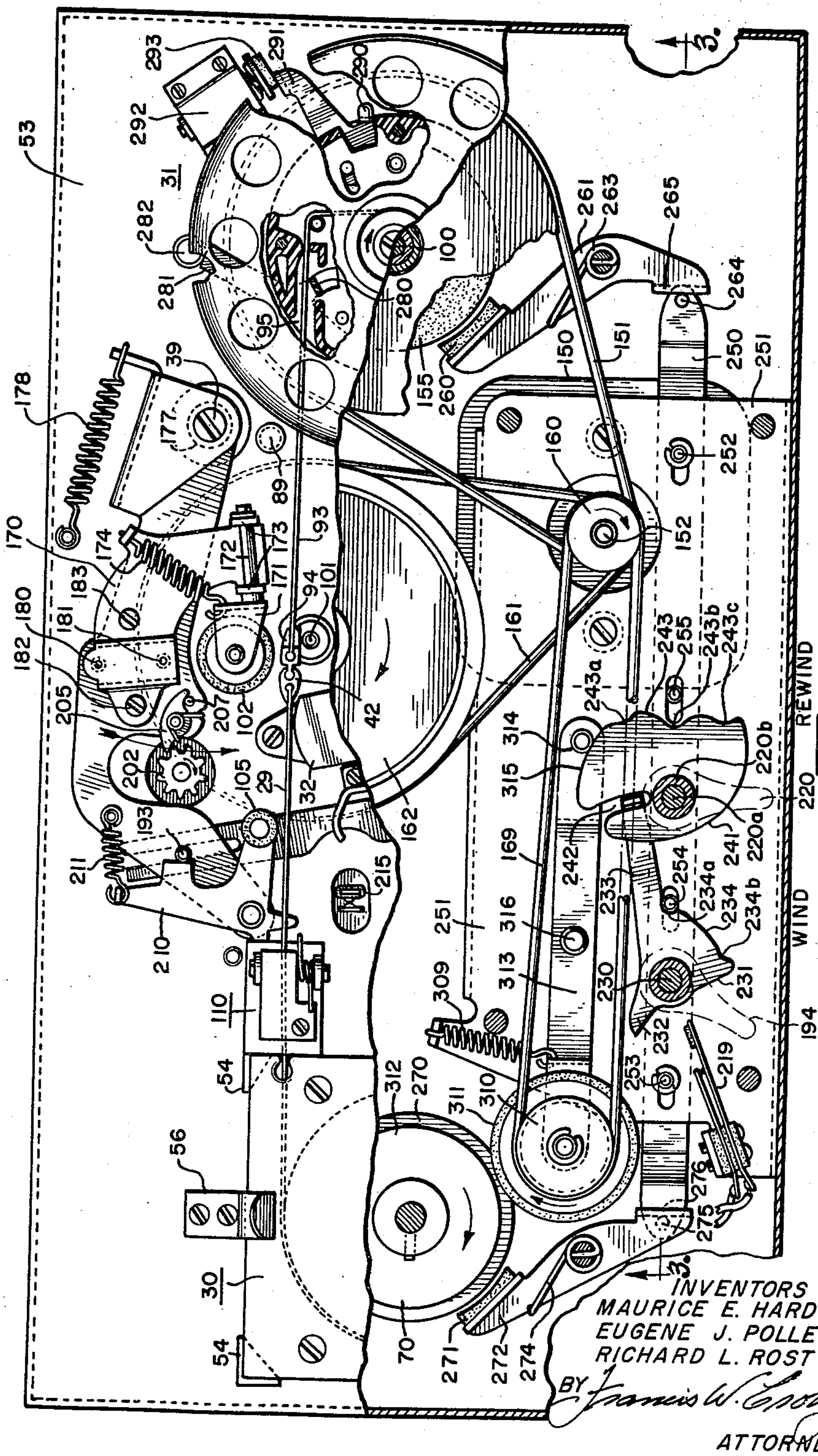
FIGURE 2 is another plan view of the apparatus partly broken away showing the position of the device just after initiating a cycle of tape transport.

It is desirable to associate with take-up reel 31 means for preventing the rotation of outer hub 91 while leader 93 is being wound about inner hub 90 at the start of a transcribing cycle and means for stopping rotation of outer hub 91 near the termination of the rewind operation with a predetermined orientation or alignment of channelway 95. To accomplish the first of these locking functions, as shown in FIGURES 2 and 9, an actuating pin 280 is positioned within channelway 95 to be displaced by the homing of extractor 94 in the channelway. Pin 280 passes through lower flange 106 of outer hub 91 and is coupled to, or preferably is a projection from, a brake lever 281 which cooperates with a stop abutment 282 extending from deck 53. Brake arm 281 is pivotally affixed to plate 106 of outer hub 91 for rotation therewith; however, when arm 281 is in contact with abutment 282, outer hub 91 is prevented from rotating in a clockwise direction. A spring 296 normally biases brake arm 281 to a position in which it will engage stop 282. As leader 93 draws extractor 94 into channelway 95 at the start of a transcription, pin 280 is displaced radially inwardly by engagement with extractor 94 thus moving brake arm 281 clockwise about its pivot and out of the path of stop 282 as shown in FIGURE 8. The outer hub is now free to rotate under the force applied to it by way of extractor 94, leader 93 and inner hub 90.

A similar locking arrangement is used for stopping the counterclockwise rotation of outer hub 91 near the termination of the rewind operation. It comprises an actuator pin 290 formed integrally with a brake arm 291. The brake arm is pivotally supported from hub plate 106 in such position that pin 290 may project through a window formed on the winding surface of outer hub 91. Brake arm 291 has a terminal portion 291*a* which is movable from the position represented in FIGURE 8 wherein it permits free rotation of hub 91 to an operative position in which terminal portion 291*a* is displaced radially outwardly so that its path of rotation is intercepted by a braking device 292. Movement of brake arm 291 is limited by means of a pin 291*b* carried by the arm and extending through an arcuate shaped slot of hub plate 106. Brake arm 291 is urged in a clockwise direction about its pivot by spring 296 which concurrently biases the first-described brake arm 281 in a counterclockwise direction about its pivot. Stop device 292 includes a plunger 293 to be impacted by brake portion 291*a* when brake arm 291 has been permitted to move to its operative position. A spring 295 enclosed with housing 294 backs the plunger and prevents its being slammed into the housing by absorbing the momentum which the outer hub may impart to the plunger upon contact. It should also be noted that the take-up reel may also be of the type which employs stationary flanges thereby reducing the inertia of the outer hub.

During the larger part of the rewind operation arm 291 is displaced out of the path of stop abutment 292 as shown in FIGURE 9 because convolutions of tape wound on hub 91 displace pin 290 and brake arm 291 counterclockwise where they remain until the last turn of tape on outer hub 91 is removed sufficiently to permit pin 290 to project through outer hub 91. This allows the pin to advance under the action of spring 296 and place brake arm 291 into the path of brake block 293. Outer hub 91 continues its rotation until arm 291 engages brake pad 292 whereupon spring 295 absorbs the momentum of the outer hub and arrests its rotation. Block 293 is positioned so that channelway 95 is substantially in alignment with the tape path when the outer hub 91 has been stopped, thereby allowing coupler 42 and extractor 94 to be withdrawn from channelway 95 and leader 93 to be unwound from inner hub 90. As leader 93 is payed out from inner hub 90, the rewind operation tends to slow down. This occurs because the amount of tape payed out during one revolution changes abruptly, decreases sharply, as the tape removal is transferred from the large outer hub to the smaller inner hub and the momentum of the take-up reel assembly prevents the change in speed of the take-up reel to maintain the rate of tape movement constant. After the coupler and extractor have been withdrawn from channelway 95, pin 280 is again freed to move into channel 95 under the bias action of spring 296 and brake arm 281 is displaced to strike against stop abutment 282 which serves to prevent rotation of the outer hub when the next tape is transcribed. Obviously, one stop abutment may serve both brake levers if desired.

To achieve mechanical coupling between the cartridge and take-up reels, leader 93 is passed along a path between a driving capstan 101 and a cooperating pressure roller 102, past a tape guide formed at the terminal portion of the magnetic transducer or head 32 mounted on an adjustable bracket 103, and between a tape guide 104 cooperating with a pressure pad 105 to a housing 110 secured to deck 53 contiguous to the portion of the cartridge where coupler 42 is accessible as shown in FIGURE 1. The threading of tape leader 93 along this path may be accomplished before the instrument is released to the customer. In normal use of the instrument thereafter, leader 93 remains properly disposed along this path, relieving the user from the annoyance of threading which is characteristic of many prior tape decks.

Reference is now made to FIGURES 4, 5 and 6 which show the structural details of housing 110. It has a channelway 111 cut out of a block 112 with a flared opening facing take-up reel 31 and leading directly to the bifurcated portion of a cartridge 30 held in place by positioning posts 54. The level of channel 111 corresponds to the position of the cartridge above deck 53. The channel is dimensioned freely to accept extractor 94 which, in its home or rest position, is disposed at the end of channel 111 in vertical alignment with the position assumed by the coupler 42 of the cartridge instantly on the deck.

To insure that extractor 94 is positioned at the extremity of the channelway adjacent the cartridge and also to prevent leader 93 and extractor 94 from being withdrawn from the housing when the extractor is not engaged with a coupler 42 of a cartridge, a safety mechanism is housed in a cavity formed in block 112. This mechanism includes a knife-like blade 113 pivotally supported within this cavity of block 112 and having a cam edge which projects into channelway 111. The blade is rotatably mounted about a pin 119 to one side of channelway 111 and has restricted movement imposed by the opposite side wall of the channelway and also by a stop post 116 which has a slot for accepting knife blade 113. Cooperating with this blade is a pawl 114 slideably supported within block 112 and having a slot for accepting knife blade 113 as a guide. The pawl is coupled to a double hairpin spring 115 which urges the pawl toward the extremity of the channelway adjacent the cartridge 30. Spring 115 is coiled about a post 117 for support and has one end positioned against an inner wall of the cavity of block 112 while the remaining end is fastened to pawl 114. Extractor 94 has a slot 120 which is of sufficient depth and location to allow the extractor to slide past the cam edge of knife blade 113 within the channelway without displacing the blade. During quiescent intervals, when the instrument is not processing a tape, the pawl 114 is normally in contact with the back portion of extractor 94 urging it toward the open end of the passageway adjacent the cartridge. If for some reason leader 93 tries to withdraw extractor 94 from housing 110 before extractor 94 engages a coupler 42 of a tape cartridge, pawl 114, which is in engagement with extractor 94, moves to the right as viewed in FIGURE 5 against the action of spring 115. As this movement continues, pawl 114 abuts post 116 as shown best in FIGURE 6*b*, and the extractor is prevented from being fully withdrawn from housing 110.

On the other hand, if extractor 94 has engaged with a coupler 42 of a tape cartridge preparatory to its being transcribed and leader 93 is pulled toward take-up reel 31, the extractor and coupler combination starts to move out of housing 110. In his movement the side wall of coupler 42 engages and displaces knife blade 113 out of channelway 111. As this occurs, knife blade 113 carries pawl 114 out of the path of extractor 94 as shown in FIGURE 6*c*. The extractor is now permitted to withdraw tape from the cartridge. After the playing cycle has been terminated and the tape has been rewound, extractor 94 is positioned within housing 110 as indicated in FIGURES 5 and 6*a*. Of course, coupler 42 and extractor 94 experience no difficulty in returning to this position since blade 113 has a bidirectional cam portion which causes the blade to clear the path in order that these elements may return. Spring 115 now restores blade 113 and pawl 114 to the normal positions and once again insures that the extractor is driven to the end of channelway 111 as shown in FIGURE 6*a*. This positions the extractor properly to facilitate removal of the cartridge that has been played and insertion of the next cartridge into playing position.

A switch operator is desired to de-energize the instrument after rewind has been completed and is incorporated into housing 110 as shown in FIGURES 4, 5 and 6. It comprises a plate 132 pivotally supported on the top surface of block 112 and urged in a counterclockwise direction by a spring 134. A tapered finger 135 depends from the underside of the plate, passing through a vertical channel 136 into channel 111 to be displaced therefrom as extractor 94 assumes its rest position. A pin 131 to be actuated by plate 132 fits loosely in a second vertically disposed channel 137 of block 112 and rests loosely upon a movable resilient contact of a switch pair 130 positioned on the under surface of deck 53 directly beneath housing 110. The connection between plate 132 and pin 131 is established through a screw 138 threaded into an opening in the plate into alignment with pin 131. Through this construction one may conveniently adjust the actuation of the switch in response to predetermined movement of plate 132.

When extractor 94 is in any position other than that shown in FIGURE 5, plate 132 responds to spring 134 and depresses pin 131 to close switch pair 130. However, as extractor 51 assumes the position shown in FIGURE 5, at the end of the rewind operation, plate 132 is displaced in a clockwise direction permitting the movable switch blade of contact pair 130 to move vertically upward and open a circuit which de-energizes the machine and terminates the rewind operation.

*Driving Mechanism*

Figure 3:
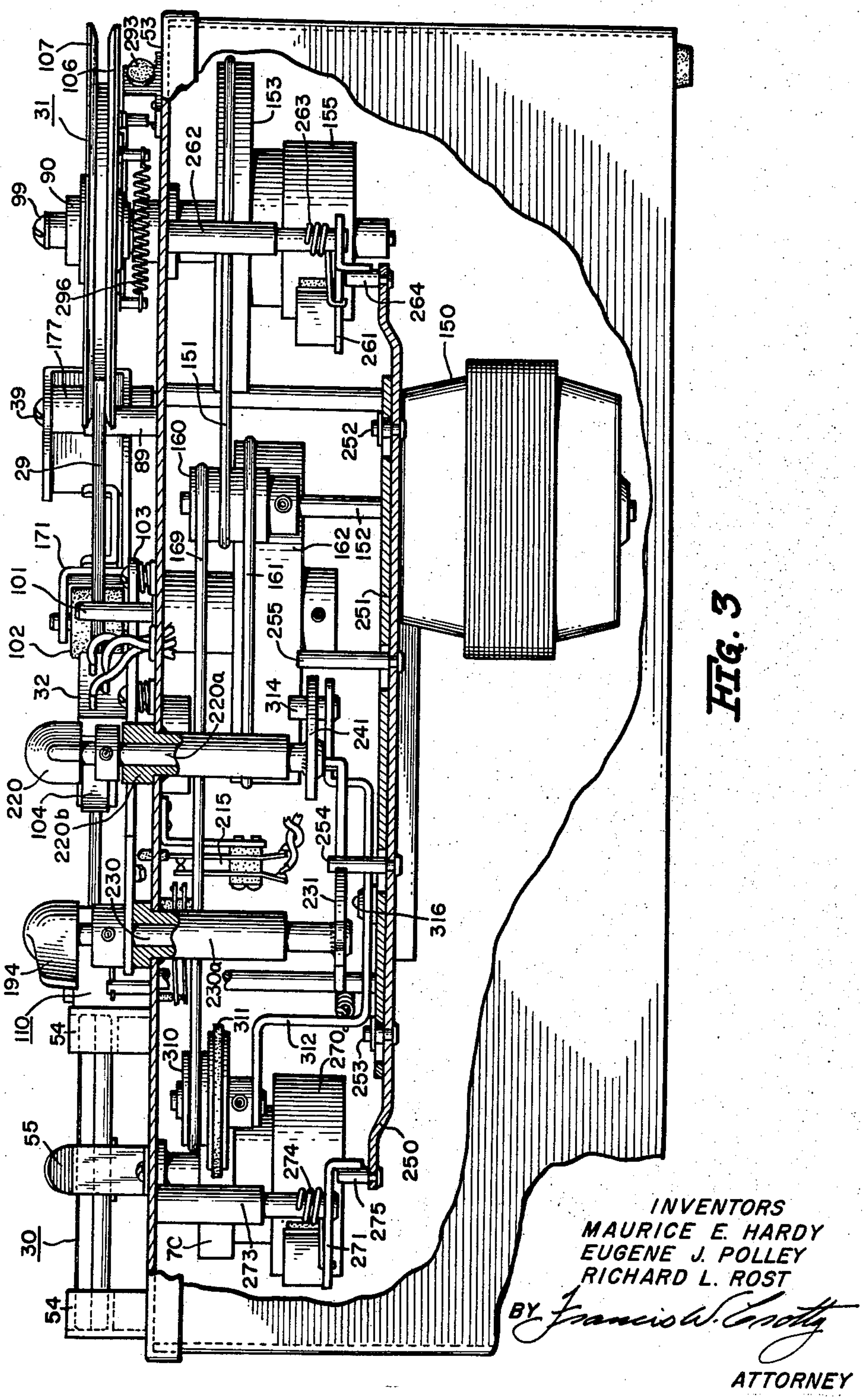
FIGURE 3 is a cross-sectional view taken along lines 3—3 of FIGURE 2.

As in any winding and reeling apparatus the tape may be payed off one reel and taken up by the other through the simple expedient of driving that reel which serves at the moment as a take-up reel. As shown in FIGURES 2 and 3 a single motor 150 drives the entire tape transport mechanism. To enable the take-up reel to initially withdraw the tape from the cartridge and to accept tape as it comes from the capstan during normal playing operation a clutch mechanism is employed.

The take-up reel driving system comprises a relatively heavy pulley 153 rotatably supported by bearing 100*b* and having a clutch surface 154 affixed to a depending reduced diameter portion thereof as best seen in FIGURE 9. A brake drum 155, having a mating clutch surface 159 on the top face thereof, is coupled to a reel drive shaft 100 by screws 157, 158. Pulley 153 is driven by a belt 151 coupled between it and a drive pulley 160 affixed to a shaft 152 of motor 150. The weight of pulley 153 in conjunction with the coefficient of friction of clutch surfaces 159 and 154 determines the transmission power of the slip clutch through which reel shaft 100 may be driven by pulley 153. Pulley 153 rotates constantly when motor 150 is energized and rotates shaft 100 only when the retarding force of the take-up reel is less than the driving power of the slip clutch. The clutch is designed so that take-up reel 31 rotates and accepts tape at all times except when spindle 41 is rewinding tape into cartridge 30 or when the reel brakes are applied as will be explained more fully hereinafter. Thus the rewind mechanism must drive cartridge spindle 41 with sufficient force to overcome the opposing force of pulley 153 which is continuously applied to take-up reel assembly 31.

The rewind mechanism comprises a rewind drive pulley 310 which is affixed to a drive wheel 311. The pulley and wheel cooperate with a drive drum 70, shown in FIGURE 4, and are rotatably supported from one end of a pivoted lever 313. A spring 309 is coupled between lever 313 and a support plate 251 and insures positive engagement of drive wheel 311 with drum 70 when the driver is in its operative position. Pulley 310 is driven by a belt 169 which is coupled to driving pulley 160. Lever 313 carries a cam follower or roller 314 which cooperates with a cam surface 315 of a plate 241. The cam plate 241 is secured to a rotatable shaft 220*a* supported by a bushing 220*b* mounted on deck 53 and terminating in a wind-rewind control 220. Counterclockwise movement of control 220 to the rewind positions presents a low portion of cam 241 to roller 314 and enables spring 309 to displace drive wheel 311 into engagement with drive drum 70. As a consequence, the drive from pulley 160 is extended to drum 70 to rotate shaft 61 and hub 40 of cartridge 30 in such a direction so as to rewind the tape from take-up reel 31 back into the cartridge. The driving force of spindle 41 and cartridge hub 40 is strong enough to overcome the opposing force exerted on the take-up reel assembly through clutch arrangement 154, 159. When the rewind operation is complete, control 220 is moved to the neutral or play position. This presents a higher section of cam 241 to roller 314 and cams lever 313 in a counterclockwise direction whereby drive wheel 311 is moved away from drive drum 70. At the same time brakes are applied to the reels as will be explained more fully hereinafter.

Driving the tape along its path by activation of the take-up reel is appropriate in the initial portion of the transcribing cycle and for search purposes, but it is desired that a more refinely controlled drive be established for the tape during transcription and that is the function of capstan 101 and its companion roller 102. The capstan 101 is driven by motor 150 from a belt 161 connected between a large pulley 162 coupled to the capstan shaft and motor pulley 160. Pulley 162 is large or massive to serve as a flywheel to reduce short term speed variations of motor 150.

Figure 7:
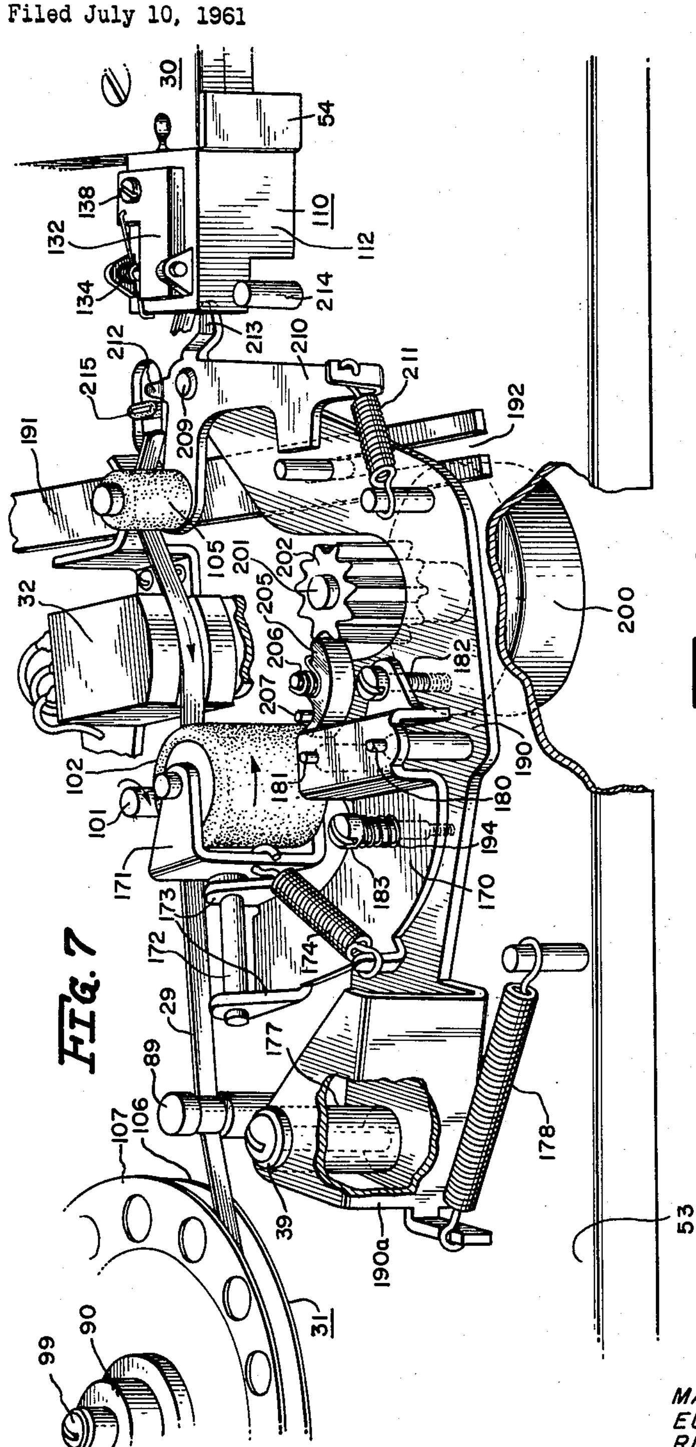
FIGURE 7 is a fragmentary perspective view of the apparatus shown in the plan view of FIGURE 1.

Tape movement by capstan 101 is accomplished with the aid of pressure roller 102 rotatably supported on a lever 170 as shown most clearly in FIGURE 7. It is necessary, for optimum performance, to have correct alignment between the roller and capstan to insure that the tape is always transported normally to the capstan and does not take a skew path which would result in movement of the tape up the capstan until the tape is no longer in contact with it. To this end roller 102 is supported by a U-shaped bracket 171 which is affixed to a horizontally disposed post 172 rotatably supported by two flange members 173 of lever 170. Mounted in this way, the roller has freedom of movement about a horizontal axis as required to maintain proper alignment with the vertically disposed capstan shaft. To properly orient the roller initially, a spring 174 is coupled between plate 170 and approximately the midpoint of U-shaped bracket 171.

For perfect alignment it is essential that the axes of rotation of the capstan and the roller be placed in the same plane and also parallel to each other within that plane. The placement of the axes in the same plane is accomplished by moving lever 170 about two pivot posts 180 and 181 which project upwardly from a positioning lever 190. Two screws 182 and 183 are passed through respective clearance holes in lever 170 and are threaded into lever 190. A spring 194 is captivated between screw 183 and plate 170 to provide a biasing force for urging plate 170 counterclockwise about screws 182, 183. As screw 182 is adjusted, plate 170 may be rotated in either direction about pivots 180 and 181 to align the cylindrical axes of capstan shaft 101 and roller 102 in the same plane. When the roller is brought into contact with the capstan, the self-aligning feature contributed by pivoted shaft 172 allows the axis of roller 102 to move parallel to the axis of capstan 101 in that plane.

Pressure roller 102 has a rest position in which it is free of capstan 101 during quiescent of transportation of tape by the capstan and an operative position in which it bears against the capstan and means are provided to selectively move the roller between such positions. This means is shown in FIGURE 1. It comprises a horizontally disposed link 191 supported above deck 53, being pivoted at one end to a termination of an actuator 195. Its opposite end has a bifurcated termination 192 which receives a pin 193 extending downwardly from plate 190 which, as previously described, carries the assembly for pressure roller 102. The end of pin 193 projecting below lever 191 may be upset or flattened to provide a support at that end of lever 191 but at the same time permitting free relative motion of this lever and plate 190.

Plate 190 is pivotally supported from deck 53 by means of a pivot post 39 and to assure a strong mechanical connection, the pivoted end of the plate carries a U-shaped bracket 190*a* through which pivot pin 39 extends and these parts may be locked together by a machine screw as indicated in FIGURE 7. A spacer 177 may be placed over pivot post 39 between the tines of the U-shaped end portion of plate 190. A bias spring 178, coupled between a post supported from the deck and the pivoted end of plate 190, biases the plate in a counterclockwise direction about its pivot, supplying a force in the appropriate direction to move roller 102 into its operative position bearing against capstan 101 if the assembly is otherwise free to assume that position.

Plate 190 may be displaced about its pivot by means of a play control 194 secured at the free end of a shaft 230 supported from deck 53 by means of a bushing 230*a*. Shaft 230 has rigidly affixed thereto an actuator 195 to the free end of which is pivoted link 191 and this link, in turn, is mechanically coupled to plate 190 as explained previously in discussing the mechanical connection of pin 193 with the bifurcated end of lever 191. An over-center spring 179 is anchored at one end to a post on the deck and at its other end to a post on actuator 195. The two extreme positions of actuator 195 are indicated in FIGURE 1, one in solid-construction line and the other in dotted-construction line.

With control 194 in its play position as shown in full-construction line, actuator 195 has its most extreme clockwise position. This moves link 191 to its closest position in the direction of control 220 and releases plate 190 to the biasing of spring 178 which tends to move plate 190 in a counterclockwise direction as required to advance the roller assembly to its operative position.

With the play control 194 in its off position, actuator 195 assumes its broken-line position or its most extreme counterclockwise location. This displaces link 191 away from control 220 and the coupling afforded by pin 193 with slot 192 causes plate 190 to be displaced clockwise about its pivot 39 to the dotted-line position of FIGURE 1. This is the rest or quiescent position of the roller assembly in which pressure roller 102 has no contact with capstan 101.

As play control 194 is moved from its off to its play position, the motor 150 is energized as will be explained hereinafter, link 191 follows immediately and spring 178 tends to cause plate 190 to follow but a time delay mechanism delays the movement of plate 190 so that pressure roller 102 does not engage capstan 101 until a certain amount of leader 93 and the tape have been taken up by reel 31.

This time-delay is accomplished through the use of a paddlewheel-type dashpot device 200 of conventional construction which is mounted to the underside of deck 53 as illustrated in FIGURE 7. The device is a cylinder filled with a putty-like or very viscous material such as silicon into which a set of paddles (not shown) is immersed. These paddles are coupled to a shaft 201 which projects upwardly from deck 53 and to which a gear 202 is mounted. The resistance of the viscous fluid to the rotation of the paddles introduces the desired time delay. The movement of lever 190 required to displace roller 102 from its rest to its operative position is controlled by dashpot 200 through a pawl 205 which is pivotally supported on a post extending from plate 190. Pawl 205 is biased in a counterclockwise direction into the path of gear 202 by a spring 206 and is permitted restricted movement in a clockwise direction by a stop pin 207. Thus, as shown in FIGURE 1, when plate 190 is moved from its operative position to the rest or broken-line position, pawl 205 is permitted to move in a counterclockwise direction past gear 202. However, when the plate is released by link 191 and spring 178 attempts to move plate 190 to its operative position, pawl 205 engages one of the teeth of gear 202 and is prevented from rotating in a clockwise direction by post 207. Thus roller 102 moves to its operating position under the control of gear 202 as the paddles within dashpot 200 move slowly through the silicon fluid under the driving force of spring 178. The viscosity of the fluid within device 200 determines the time-delay in the movement of plate 190. The relationship of this delay with respect to overall operation of the transport mechanism will be explained more fully hereinafter.

It is most desirable that there be efficient magnetic coupling between the tape and transcribing head 32 and this results from having a well-defined path of travel of the tape past the head. This path is defined by the capstan and pressure roller on one side of the transcribing head and a guide 104 and pad 105 on the opposite side. Since coupling of the head to the tape is of importance during intervals in which the tape is subject to the driving effect of capstan 101, it is arranged that pressure pad 105 assume its operating position only when the pressure roller 102 is effective. Pad 105 is mounted on a bellcrank 210 which is pivotally mounted to plate 190 by a pin 209. A spring 211 is coupled between lever 190 and bellcrank 210 while two fingers 212 and 213 project from one corner of the bellcrank. Finger 213 cooperates with a post 214 mounted to deck 53 to rotate pad 105 counterclockwise out of the path of tape travel during rewind when plate 190 is in its quiescent position. Finger 212 on the other hand, cooperates with a switch pair 215 which selectively de-energizes the machine. A tape guide post 89 is positioned adjacent take-up reel 31 to further define the tape path.

During the tape transport portion of the cycle of operation, the tape is transcribed as it passes over head 32 under the drive of the capstan. As previously stated, one end of the tape is affixed to hub 40 of cartridge 30 and, as a result, when all the tape has been transcribed a tension is created within the tape by the pulling effect of the capstan on the tape. This tension causes the tape to move pad 105 counterclockwise about pivot 209 so that finger 212 opens switch contacts 215, de-energizing the machine. The tension remains until plate 190 is moved to its rest position shown in broken lines in FIGURE 1. As bellcrank 210 moves with plate 190, finger 213 engages post 214 and rotates the bellcrank about pivot 209 to insure that pressure pad 105 is clear of the path taken by the tape during rewind. Spring 211 which biases pad 105 to engage guide 104 is of a strength which allows the tension developed in the tape by the capstan at the end of play to overcome the force exerted by the spring in order that switch pair 215 may be actuated and de-energize the machine. It should be noted that movement of the pressure pad assembly due to increased tape tension may also be used to actuate a system of mutilated gears and levers to raise the pressure pad and roller assembly out of the tape path and initiate an automatic rewind operation.

*Overall Operation*

To operate the tape deck, a cartridge is placed in the area defined by posts 54. The cartridge is oriented so that it is in mechanical coupling engagement with extractor 94 of the take-up arrangement as required for transcription. To start transcription control 194 is moved to the play position. This places the instrument in the start mode in which inner hub 90 of take-up reel 31 is driven to present program tape to the transcribing head 32. Simultaneously, link 191 releases plate 190 and pawl 205 engages a tooth of star wheel 202. The length of the time-delay provided by dashpot 200 is such that coupling elements 94 and 42 will have cleared capstan 101 and its pressure roller 102 before the drive is transferred to the capstan, that is to say, before plate 190 will have reached its operative position. When the coupling elements reach channelway 95, pin 280 is depressed and the outer hub is caused to rotate due to the coupling effected between the inner and outer hubs through leader 93 and extractor 94. Thus inner and outer hubs 90 and 91 rotate concurrently and the tape is wound around the outer hub after transcription. When the tape has been fully transcribed, tension exerted by the capstan drive on the tape causes finger 212 to open switch 215 and de-energize the apparatus. The operator of the device must move control 194 from the play to the off-search position to move pressure pad 105 and roller 102 out of the tape path and also to allow switch 212 to close. Next, high speed control 220 must be moved to the rewind position to activate the rewind transport mechanism and the rewind operation continues until extractor 94 reaches housing 110 and switch pair 130 is opened thereby de-energizing the machine.

*Braking System*

A braking system is included in the instrument further to control cartridge spindle 41 and take-up spindle 100. This system comprises a brake arm 272 pivotally supported on a post 273 depending from deck 53 as shown in FIGURE 3 and carrying a brake shoe 271 at the end thereof adjacent brake drum 270 of the cartridge spindle assembly. A spring 274 biases brake arm 272 clockwise, tending to apply shoe 271 to drum 270. There is a similar arrangement of a brake arm 261, brake shoe 260, pivot post 262 and bias spring 263 associated with brake drum 155 of the take-up reel assembly. The response of these brake arms to their bias springs and the application of the brake shoes to their respective drums is determined by a slide bar 250 which may be seen in FIGURES 2 and 3. Pins 275 and 264 extend from the opposite ends of bar 250 into engagement with flanges depending from the ends of brake arms 272 and 261, respectively, to actuate the brakes in accordance with the position of bar 250.

Bar 250 is slideably supported from a guide plate 251 which is suspended from deck 53 in suitable fashion. A pair of pins 252 and 253 project from slide bar 250 through slotted apertures formed at the ends of plate 251 and these pins may be headed over or otherwise arranged mechanically to support as well as guide slide bar 250. Additionally, cam followers 254 and 255 project from slide bar 250 through other slots formed in plate 251 to position slide bar 250 as determined by the cam sections of a pair of control plates 231 and 241 associated with these cam followers respectively.

Control plate 231 is affixed to shaft 230 which may be displaced by movement of play-off control 194. Plate 231 has a pair of finger extensions 232 and 233 and also a double-lobed cam section 234 having recessed portions 234*a* and 234*b* for actuating the brake system in the manner to be explained hereinafter.

Control plate 241 is similarly affixed to shaft 220*a* which may be displaced by actuation of the search-rewind control 220. Plate 241 has a channelway 242 extending radially inwardly from the periphery thereof and provided to receive a vertically extending termination of finger 233 of control plate 231. Control plate 241 also has recessed cam portions 243*a*, 243*b* and 243*c*.

To understand the operation of the braking system it will be assumed initially that a cartridge is in position on deck 53 and control 194 is in the off position while control 220 is in the play position. With the controls in these positions recessed portion 234*b* of cam surface 234 is presented to cam follower 254 and recessed portion 243*b* of control plate 241 is presented to cam follower 255, thereby allowing springs 274 and 263 to move brake blocks 271 and 260 into engagement with brake drums 270 and 155 of the spindle assemblies. Pressure roller 102 is in its rest position and there is no movement of the tape. When control 194 is moved to the play position, finger 233 of control plate 231 swings into channelway 242 of control plate 241 and cam section 234*a* of control plate 234 is now presented to cam follower 254. Cam section 234*a* has a further radial spacing from shaft 230 than does cam section 234*b* and thus slide bar 250 is cammed to the right, moving brake blocks 260 and 271 away from their associated brake drums. The instrument is now conditioned to transcribe a tape. When finger 233 is thus lodged in channelway 242 of control plate 241 search-rewind control 220 cannot be moved from the play position. In other words, it is disabled or locked against actuation during the play of the tape.

In the event that the operator desires to search the tape in the forward direction, or rewind the tape, or search in the reverse direction, it is necessary to first move play control 194 to the off-search position first described. This reapplies the brakes to the brake drums to halt movement of the tape. As control 194 is moved to its off-search position, finger 233 is withdrawn from channel 242 and the lock out condition of control 220 is released. Obviously, the brakes must be released to allow a search-rewind operation and this is accomplished as control 220 is rotated to either its wind or rewind positions. When control 220 moves to its wind position, recessed cam portion 243*a* of plate 241 is presented to cam follower 255 and since it has a further radial spacing from shaft 220*a* than does cam section 243*b*, slide bar 250 is cammed to the right relasing the brakes and freeing the spindle assemblies for rotation. The same result is achieved if control 220 is moved to the rewind position, presenting cam section 243*c* to cam follower 255.

When the wind or rewind operation is completed, control 220 is returned to its play position and follower 255 once again comes in contact with low cam portion 243*b* of control plate 241, allowing the brakes to move to an energized position and stop rotation of the hubs. To resume the playing operation, play-off control 194 must again be moved to the play position, as shown in FIGURE 2, whereupon the brakes are again released because cam follower 254 of bar 250 is now in contact with low cam portion 234*a* of control plate 241.

In summary, the reel brakes are applied when control 194 is in the off-search position and control 220 is simultaneously in the play position. The brakes are de-energized when the play-off control 194 is in the play position and also when control 194 is in the off-search position and control 220 is simultaneously either in the wind or rewind positions.

*Control Circuitry*

Figure 10:
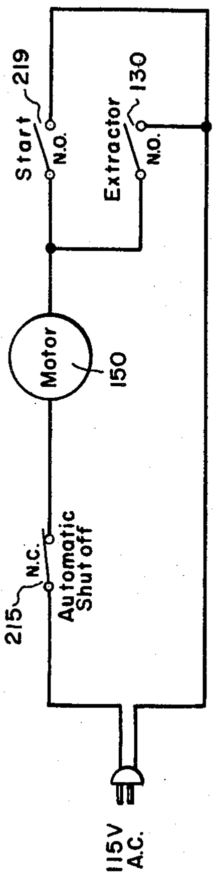
FIGURE 10 is a schematic diagram of the circuitry of the instrument except for the signal reproducing system which is connected to the transcribing head.

The apparatus is energized by a conventional 110-volt source through a line plug as shown in FIGURE 10. One side of the line is coupled by way of switch pair 215 to motor 150. From motor 150 the circuit passes through the parallel combination of switch pair 219 associated with the play-off control and switch pair 130 associated with extractor housing 110 and returns to the other side of the 110-volt line.

In normal operation the transport mechanism plays a tape in its entirety and is de-energized when the tape has been completely transcribed. When play control 194 is moved to the search-off position and rewind control 220 is placed in the rewind position, the machine returns the tape to the cartridge and automatically de-energizes the transport mechanism when extractor 94 reaches its home position within housing 110.

More specifically, when play-off control 194 is moved to the play position, normally open contact pair 219 is closed because finger 232 of control plate 231 which normally holds this contact pair open is moved away to permit the contacts to close. The circuit to driving motor 150 is now completed through the normally closed switch pair 215 to the A.C. line. As soon as extractor 94 leaves housing 110, switch pair 130 closes and remains closed until such time as the extractor returns to its home position within the housing. With the closing of switch pair 130, any further opening and closing of contact pair 219 is ineffective. Thus, when off-play control 194 is moved to its off position, switch 219 is opened by finger 232 but the motor remains energized. Once the extractor has been withdrawn from the housing, the machine will only become completely de-energized either when the tape has been completely transcribed and the tension produced in the tape causes pressure pad 105 to move upward opening contact pair 215 or when extractor 94 returns to housing 110 thereby oepning switch 130.

When the machine has become de-energized by the opening of switch pair 215 indicating that the transcription of the tape has been completed, it is essential that the operator move control 194 from its play position to its off-search position. This displaces plate 190 and pressure roller 105 to their rest positions and carries search actuator 212 out of the way to allow contact pair 215 to close thereby reactivating the machine. Thus the machine is energized and the rewind operation may be commenced. When extractor 94 returns to its home position within housing 110, switch pair 130 is opened and the transport mechanism becomes de-energized.

The conductors 340 leading from the pickup or transcribing head 32 connect with audio or other reproducing systems of conventional construction. Since no claim of novelty is predicated on this signal reproducing circuitry, the circuit arrangement has not been shown.

The winding and reeling apparatus described herein provides simplified tape transcription by eliminating the necessity of manually threading the tape along a specified path. The apparatus utilizes a self-aligning pressure roller which prevents skew movement of the tape as it is transported by the capstan by placing the axis of rotation of the pressure roller substantially parallel to the axis of rotation of the capstan.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

We claim:

1. Winding and reeling apparatus for transporting a flexible tape from a storage reel to a take-up reel, said apparatus comprising: a transport mechanism, including a capstan having an axis of rotation, for moving said tape between said reels; a pressure roller, likewise having an axis of rotation, maintained in a rest position adjacent said capstan during quiescent intervals but movable to an operating position to effect transport of said tape by said capstan; first aligning means for displacing said axis of said roller in a plane parallel to said axis of said capstan to establish a coplanar relation of their axes; and self-aligning means for displacing said axis of said roller in the plane of said axis of said capstan to establish a parallel relation of said axes in their common plane when said roller is in its aforesaid operating position.

2. Winding and reeling apparatus for transporting a flexible tape from a storage reel to a take-up reel, said apparatus comprising: a transport mechanism, including a capstan having an axis of rotation, for moving said tape between said reels; a pressure roller, likewise having an axis of rotation maintained in a rest position adjacent said capstan during quiescent intervals but movable to an operating position to effect transport of said tape by said capstan; a shaft pivotally supporting said roller to permit said roller to align itself in line contact with said capstan as said roller is moved into its said operating position; and biasing means for placing said axis of said roller approximately parallel to said axis of said capstan while said roller is in its said rest position.

3. Winding and reeling apparatus for transporting a flexible tape from a storage reel to a take-up reel, said apparatus comprising: a transport mechanism, including a capstan having an axis of rotation, for moving said tape between said reels; a pressure roller, likewise having an axis of rotation maintained in a rest position adjacent said capstan during quiescent intervals but movable to an operating position to effect transport of said tape by said capstan; mounting means for supporting said roller; adjusting means for varying the position of said mounting means to place said axis of said roller in a plane parallel to said axis of said capstan to establish a coplanar relation of their axes; and swivel means coupling said roller to said mounting means for automatically establishing said axis of said roller in the plane of said axis of said capstan to establish a parallel relation of said axes in their common plane when said roller is in its aforesaid operating position.

References Cited in the file of this patent

UNITED STATES PATENTS

| | | |
|---|---|---|
| 2,153,214 | Tondreau | Apr. 4, 1939 |
| 2,946,585 | Rosenberg | July 26, 1960 |
| 2,951,652 | Rezek et al. | Sept. 6, 1960 |
| 2,988,257 | Lasarev et al. | June 13, 1961 |
| 2,998,906 | Vice et al. | Sept. 5, 1961 |
| 3,029,992 | Roman | Apr. 17, 1962 |